US012682745B2

(12) United States Patent
Inoue et al.

(10) Patent No.: US 12,682,745 B2
(45) Date of Patent: Jul. 14, 2026

(54) MOBILE OBJECT MONITORING SYSTEM AND MOBILE OBJECT MONITORING METHOD

(71) Applicant: HONDA MOTOR CO., LTD., Tokyo (JP)

(72) Inventors: Shigeru Inoue, Wako (JP); Hideki Matsunaga, Wako (JP); Masamitsu Tsuchiya, Wako (JP); Kenji Komori, Wako (JP); Takahiro Kurehashi, Wako (JP); Hiroki Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 18/752,921

(22) Filed: Jun. 25, 2024

(65) Prior Publication Data

US 2024/0346921 A1 Oct. 17, 2024

Related U.S. Application Data

(62) Division of application No. 17/199,809, filed on Mar. 12, 2021, now Pat. No. 12,057,012.

(30) Foreign Application Priority Data

Mar. 17, 2020 (JP) ................................. 2020-047009

(51) Int. Cl.
| | |
|---|---|
| *G08G 1/01* | (2006.01) |
| *G06V 20/56* | (2022.01) |
| *H04N 23/90* | (2023.01) |

(52) U.S. Cl.
CPC ........... *G08G 1/0133* (2013.01); *G06V 20/56* (2022.01); *G08G 1/0116* (2013.01); *H04N 23/90* (2023.01)

(58) Field of Classification Search
None
See application file for complete search history.

(56) References Cited

U.S. PATENT DOCUMENTS

| | | | |
|---|---|---|---|
| 2012/0148102 A1* | 6/2012 | Moriguchi | G06T 7/277 |
| | | | 382/103 |
| 2016/0236682 A1* | 8/2016 | Takada | B60W 30/09 |

(Continued)

FOREIGN PATENT DOCUMENTS

| | | |
|---|---|---|
| JP | 2015-230665 A | 12/2015 |
| JP | 2017-55177 A | 3/2017 |

(Continued)

OTHER PUBLICATIONS

"Morikazu Sato, Mobile body information distribution device, mobile body information processing device, mobile body information distribution system, mobile body information distribution program, and mobile body information processing program, Nov. 15, 2018" (Year: 2018) [English Translation of JP-2018181049].*

*Primary Examiner* — Abby J Flynn
*Assistant Examiner* — Bakari Underwood
(74) *Attorney, Agent, or Firm* — Rankin, Hill & Clark LLP

(57) ABSTRACT

A mobile object monitoring system including a terminal unit installed in a vehicle and a monitoring unit configured to monitor an unknown mobile object around the vehicle. The terminal unit includes: an information acquisition component that acquires unknown mobile object information including information on presence or absence of an unknown mobile object; a determination component that determines presence or absence of an unknown mobile object regarding a blind spot; a time-of-absence information generation component that generates a time-of-absence information set concerning an unknown mobile object that includes absence information of an unknown mobile object (Continued)

in the blind spot and time information on a time of determination; and a communication component that transmits the time-of-absence information set. The monitoring unit receives time-of-absence information sets from terminal units and establishes, regarding the received time-of-absence information sets, reliability of absence information based on the number of time-of-absence information sets with overlapping time ranges that are based on the time information on a time of determination.

2 Claims, 6 Drawing Sheets

(56)                           References Cited

U.S. PATENT DOCUMENTS

| | | | |
|---|---|---|---|
| 2017/0046958 | A1 | 2/2017 | Naka et al. |
| 2017/0069090 | A1 | 3/2017 | Okumura et al. |
| 2018/0357493 | A1 | 12/2018 | Takamatsu et al. |
| 2019/0251316 | A1 | 8/2019 | Okumura et al. |
| 2020/0180638 | A1 | 6/2020 | Kanoh |
| 2021/0124956 | A1 | 4/2021 | Takamatsu et al. |

FOREIGN PATENT DOCUMENTS

| | | | | |
|---|---|---|---|---|
| JP | 2018181049 A | * 11/2018 | ......... | G06F 12/0607 |
| JP | 2020-004144 A | 1/2020 | | |
| WO | 2017029847 A1 | 2/2017 | | |
| WO | 2018/216194 A1 | 11/2018 | | |

* cited by examiner

Figure 3:
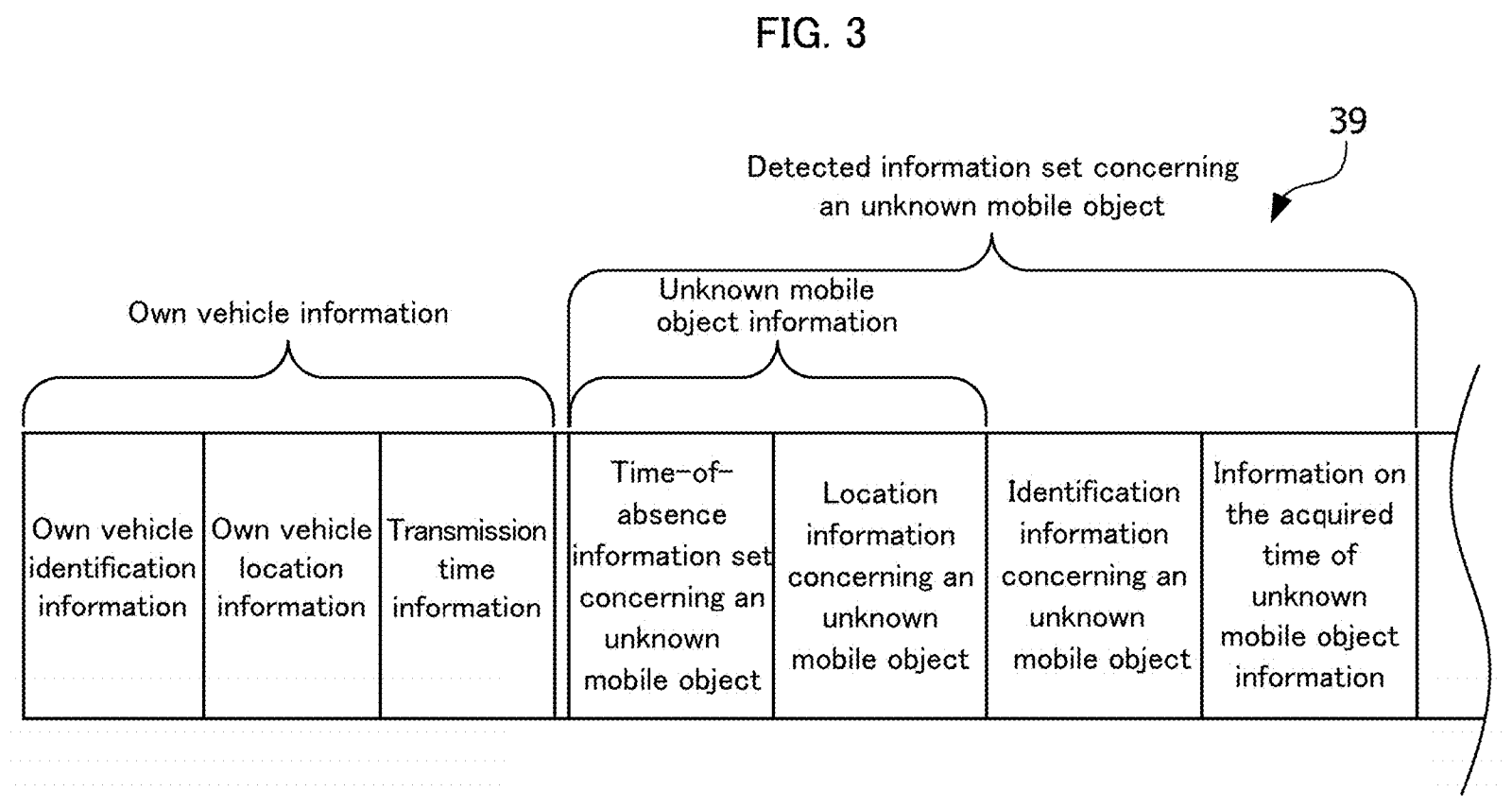

Detected information set concerning an unknown mobile object

| Own vehicle information | | Unknown mobile object information | | | |
|---|---|---|---|---|---|
| Own vehicle identification information | Own vehicle location information | Transmission time information | Time-of-absence information set concerning an unknown mobile object | Location information concerning an unknown mobile object | Identification information concerning an unknown mobile object | Information on the acquired time of unknown mobile object information |

MOBILE OBJECT MONITORING SYSTEM AND MOBILE OBJECT MONITORING METHOD

CROSS-REFERENCE STATEMENT

This application is a divisional of U.S. Ser. No. 17/199,809 filed on Mar. 12, 2021, which is based on and claims priority from Japanese Patent Application No. 2020-047009, filed Mar. 17, 2020, the disclosure of which is hereby incorporated by reference herein in its entirety.

BACKGROUND

Technical Field

The disclosure relates to a mobile object monitoring system and mobile object monitoring method.

Related Art

Popularity of vehicles with automated driving functions has been rising in recent years as a means of realizing safe and comfortable travel while reducing the burden of drivers.

For an automated vehicle to travel safely, the driving support apparatus that the automated vehicle is equipped with must have accurate information regarding the distribution of objects that surround the vehicle. The objects may, for example, include guardrails, traffic signals, signs, and traffic participants such as other vehicles, motorcycles, bicycles, and pedestrians.

To address this need, Patent Literature 1 (Japanese Unexamined Patent Application Publication No. 2020-4144) discloses an obstacle map generation device for generating an obstacle map using information on obstacles that are observed by an obstacle observation means. According to Patent Literature 1, the generated obstacle map indicates a movable area for a vehicle, an area occupied by an obstacle, and a blind spot.

The obstacle map generation device according to Patent Literature 1 includes an obstacle information acquisition component for acquiring information on obstacles that are observed by the obstacle observation means; a calculation component for calculating obstacle locations based on the information on obstacles acquired by the obstacle information acquisition component; a virtual point setting component for setting a location of a virtual point that is different from where the obstacle observation means is installed; and a virtual area determination component for determining a movable area and blind spot as observed from the virtual point based on the locations of the virtual point and obstacles.

The obstacle map concerning distribution information of obstacles according to the obstacle map generation device of Patent Literature 1 contributes to the travel safety of automated vehicles.

However, gaining accurate and omission free information regarding an unknown mobile object that is in a blind spot of a point of observation remains an issue that is unresolved by the obstacle map generation device of Patent Literature 1. Furthermore, there is also an issue concerning reliability of information regarding unknown mobile objects.

SUMMARY

An embodiment of the disclosure provides a mobile object monitoring system including: one or more terminal units; and a monitoring unit configured to collect information concerning an unknown mobile object around each of the one or more terminal units and to monitor the unknown mobile object. Each of the one or more terminal units includes: an information acquisition component configured to acquire unknown mobile object information, the unknown mobile object information including information on presence or absence of the unknown mobile object; a terminal-side determination component configured to determine presence or absence of the unknown mobile object regarding a predetermined monitored area; a time-of-absence information generation component configured to generate, in response to the terminal-side determination component determining that the unknown mobile object is absent from the monitored area, a time-of-absence information set concerning an unknown mobile object, the time-of-absence information set including absence information and time information on a time of the determination, the absence information indicating the absence of an unknown mobile object regarding the monitored area; and a terminal-side communication component configured to transmit the time-of-absence information set that is generated. The monitoring unit includes: a collecting-side communication component configured to receive the time-of-absence information set transmitted from the terminal-side communication component of each of the one or more terminal units to form a collection of one or more time-of-absence information sets; and a collecting-side determination component configured to determine, based on the collection of one or more time-of-absence information sets, whether an unknown mobile object regarding the monitored area is absent in a time range that is based on the time information. The collecting-side determination component is configured to establish reliability of the absence information for the collection of one or more time-of-absence information sets based on the number of time-of-absence information sets in a first group of time-of-absence information sets with overlapping time ranges that are based on the time information, the first group forming a part or whole of the collection of one or more time-of-absence information sets.

DRAWINGS

FIG. 3 is a schematic diagram of a data transmission frame that is transmitted from a terminal unit to a monitoring unit in a mobile object monitoring system in accordance with at least one embodiment.

DETAILED DESCRIPTION

Figure 1:
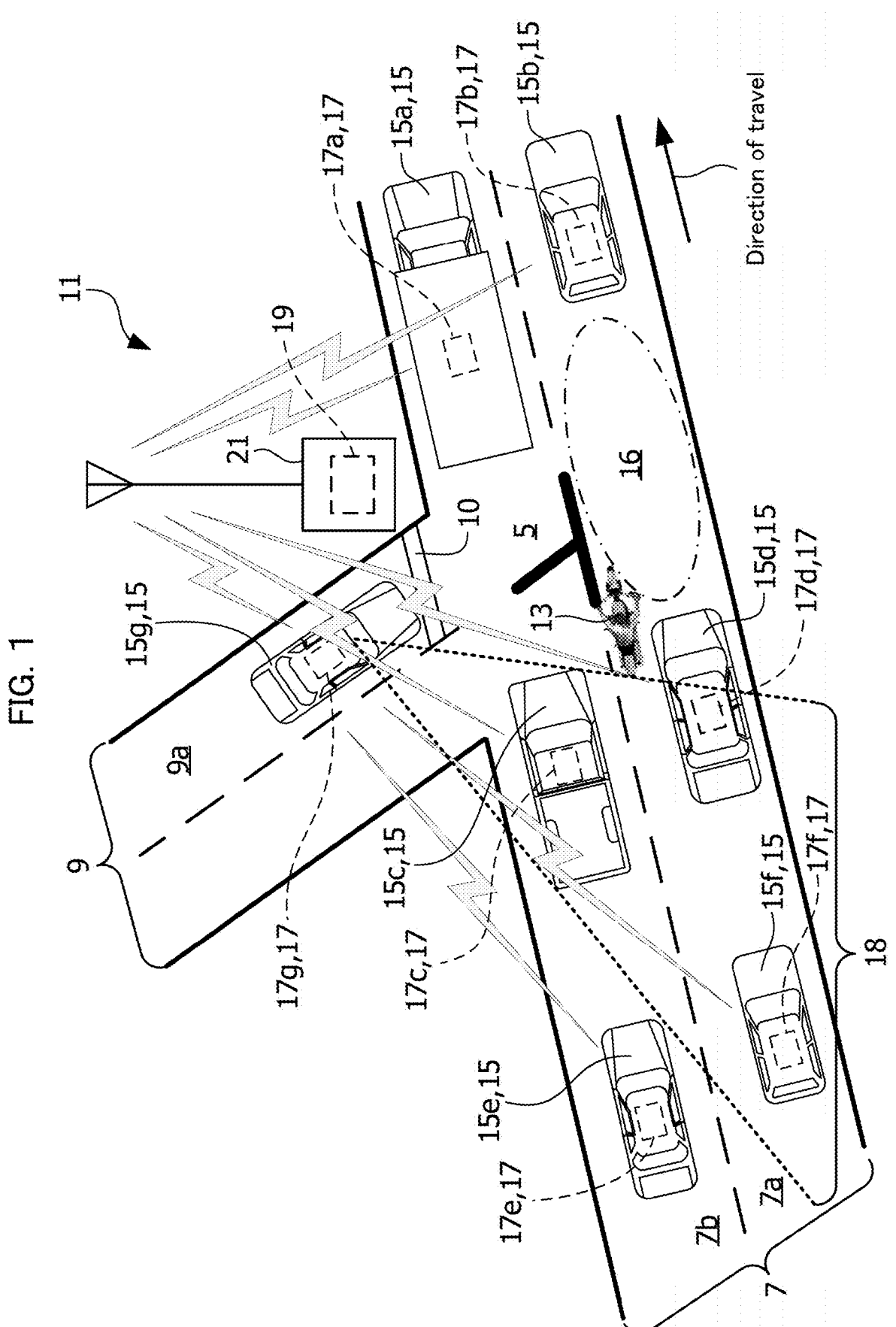
FIG. 1 is a schematic diagram showing an overview of a mobile object monitoring system in accordance with at least one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A detailed description of a mobile object monitoring system and mobile object monitoring method in accordance with an embodiment of the disclosure follows with reference to drawings.

Note that in the drawings, components with a common function that do not need to be identified separately use a common reference symbol in the drawings. Furthermore, for convenience of explanation, components may be shown schematically with shapes and sizes of the components modified or exaggerated.

The object of the disclosure is to provide a mobile object monitoring system and mobile object monitoring method that are capable of increasing the reliability of information regarding an unknown mobile object that is in a blind spot of a point of observation.

In the description that follows, a mobile object monitoring system and mobile object monitoring method that are in accordance with an embodiment of the disclosure and capable of increasing the reliability of information regarding absence of an unknown mobile object in a blind spot of a point of observation are described.

<<Configuration of Mobile Object Monitoring System 11>>

A configuration of a mobile object monitoring system 11 according to an embodiment of the disclosure is described with reference to FIG. 1.

FIG. 1 is a schematic diagram showing an overview of a mobile object monitoring system 11 in accordance with an embodiment.

As shown in FIG. 1, a mobile object monitoring system 11 according to an embodiment includes a monitoring function that monitors an unknown mobile object 13 by collecting, through vehicle-to-vehicle communication or vehicle-to-roadside communication, absence information regarding an unknown mobile object 13 that has been acquired at individual detection sites and integrating the collection of absence information.

To achieve the monitoring function, the mobile object monitoring system 11 is configured to include, as shown in FIG. 1, a monitoring unit 19 and a plurality of terminal units 17a-17g that are installed respectively in a plurality of vehicles 15a-15g.

Note that when distinction among vehicles is not necessary, one or more of the vehicles 15a-15g may generically be referred to as a vehicle 15 or vehicles 15. Similarly, when distinction among terminal units is not necessary, one or more of the terminal units 17a-17g may generically be referred to as a terminal unit 17 or terminal units 17. Each of the plurality of vehicles 15a-15g corresponds to a "mobile object" of the disclosure. A "mobile object" of the disclosure may be any object that is capable of movement such as a large-sized vehicle, a standard-sized vehicle, a motorcycle, a bicycle, or a pedestrian.

The monitoring unit 19 may be installed, for example, in a roadside unit 21. The monitoring unit 19 includes a function for monitoring an unknown mobile object 13 around each of the plurality of vehicles 15a-15g by cooperating with the plurality of terminal units 17a-17g.

An unknown mobile object 13 is a mobile object with a part or whole thereof inside a blind spot 18 related to a point of observation (in the example of FIG. 1, the vehicle 15g) such as another vehicle, a motorcycle, a bicycle, or a pedestrian that is present around an own vehicle 15 that is installed with a terminal unit 17. An unknown mobile object 13 may be a mobile object that is showing an odd behavior, such as moving at a different speed to the own vehicle 15 and any other vehicle close by (that may, for example, be stationary).

A blind spot 18 of a point of observation is an area that cannot be viewed directly from the point of observation and is an area that is behind an object (such as a sign) that is present around the point of observation.

Making an unknown mobile object 13 a monitoring target is based on the Applicants' knowledge that the presence of such an unknown mobile object 13 has a tendency to disrupt traffic and to cause traffic accidents.

The environment in which the monitoring unit 19 and the terminal units 17 mounted on individual vehicles 15 are installed is next described.

FIG. 1 shows an unknown mobile object 13 and a plurality of vehicle 15a-15g that are travelling in the vicinity of a three-way junction 5. The three-way junction 5 of FIG. 1 has a minor road 9, with a single lane in each direction, intersecting with a main road 7 with two lanes in each direction.

On the main road 7, three vehicles 15b, 15d, and 15f are travelling at reduced speed on a right-hand lane 7a, and another three vehicles 15a, 15c, and 15e are travelling at reduced speed on a left-hand lane 7b. Note that the "right-hand" and "left-hand" describe sides with respect to a direction of travel as indicated by an arrow. The vehicles 15a-15f are equipped respectively with responding-side terminal units 17a-17f. The responding side terminal units 17a-17f refer to terminal units 17 that are providers of a time-of-absence information set.

In other words, on the main road 7 of FIG. 1, terminal units 17b, 17d, and 17f, which are installed respectively on vehicles 15b, 15d, and 15f, are shown to be located on the right-hand lane 7a and terminal units 17a, 17c, and 17e, which are installed respectively on vehicles 15a, 15c, and 15e, are shown to be located on the left-hand lane 7b.

On the minor road 9 (with a single lane in each direction), a single vehicle 15g is stationary at a stop line 10 on a driving lane 9a. The vehicle 15g is facing the three-way junction 5 and is waiting to join traffic in the main road 7 in the direction of travel. This vehicle 15g is equipped with a requesting-side terminal unit 17g. A requesting-side terminal unit 17g refers to a terminal unit 17 that requests the provision of a time-of-absence information set.

In other words, on the minor road 9 of FIG. 1, there is a single terminal unit 17g that is installed on the single vehicle 15g on the driving lane 9a. The driver of this vehicle 15g is waiting for an opportunity to move into a gap 16 between the vehicle 15b and vehicle 15d on the right-hand lane 7a to join the main road 7, a priority road.

An unknown mobile object 13 may, for example, be a motorcycle. The unknown mobile object 13 of FIG. 1 is moving through traffic at a higher speed compared to surrounding vehicles 15 on the main road 7. While traveling on the right-hand lane 7a, the unknown mobile object 13 makes use of the space to the left of the vehicles 15f and 15d that are traveling at reduced speed (note that "left" refers to a side with respect to the direction of travel).

In FIG. 1, the monitoring unit 19 is installed on the left corner of the three-way junction 5 as viewed when travelling towards the three-way junction 5 on the main road 7 in the direction of travel.

The three-way junction 5 may, for example, be an accident black spot (a junction with a high concentration of accidents).

When there is congestion at the three-way junction 5, because of a blind spot, movements of all obstacles including a vehicle 15 and an unknown mobile object 13 that are travelling on the main road 7 may not be observable. In the example of FIG. 1, a blind spot 18 spreads behind the vehicle 15*c* for the driver of the vehicle 15*g* that is waiting at the stop line 10 of the driving lane 9*a* of the minor road 9. The whole of the vehicle 15*f* and a back portion of the vehicle 15*d* are inside the blind spot 18. The unknown mobile object 13 is not in the blind spot 18.

Consider a case where the whole of the unknown mobile object 13 is inside the blind spot 18 of the driver of the vehicle 15*g* and the unknown mobile object 13 is making its way to the three-way junction 5 by threading through a group of vehicles 15 at a greater speed than the vehicles 15 of the group.

In such cases, if the driver of the vehicle 15*g* enters the three-way junction 5 by only paying attention to the movement of the vehicle 15*d* while attempting to join the main road 7 traffic on the right-hand lane 7*a*, the vehicle 15*g* is in danger of colliding with the approaching unknown mobile object 13 when entering the gap 16 between the vehicles 15*b* and 15*d*.

The mobile object monitoring system 11 according to an embodiment of the disclosure monitors the blind spot 18 of a vehicle 15*g* by (a) collecting, via vehicle-to-vehicle communication or vehicle-to-roadside communication, time-of-absence information sets concerning an unknown mobile object 13 (details are given later) that have each been obtained at a corresponding detection site, and (b) integrating the collection of time-of-absence information sets in order to improve the reliability of information regarding absence of an unknown mobile object 13 in the blind spot 18.

<<Configuration of an On-Board Device 31 Equipped with Terminal Unit 17>>

The configuration of an on-board device 31 equipped with the terminal unit 17 is described with reference to FIG. 2. The on-board device 31 is installed on a vehicle 15.

Figure 2:
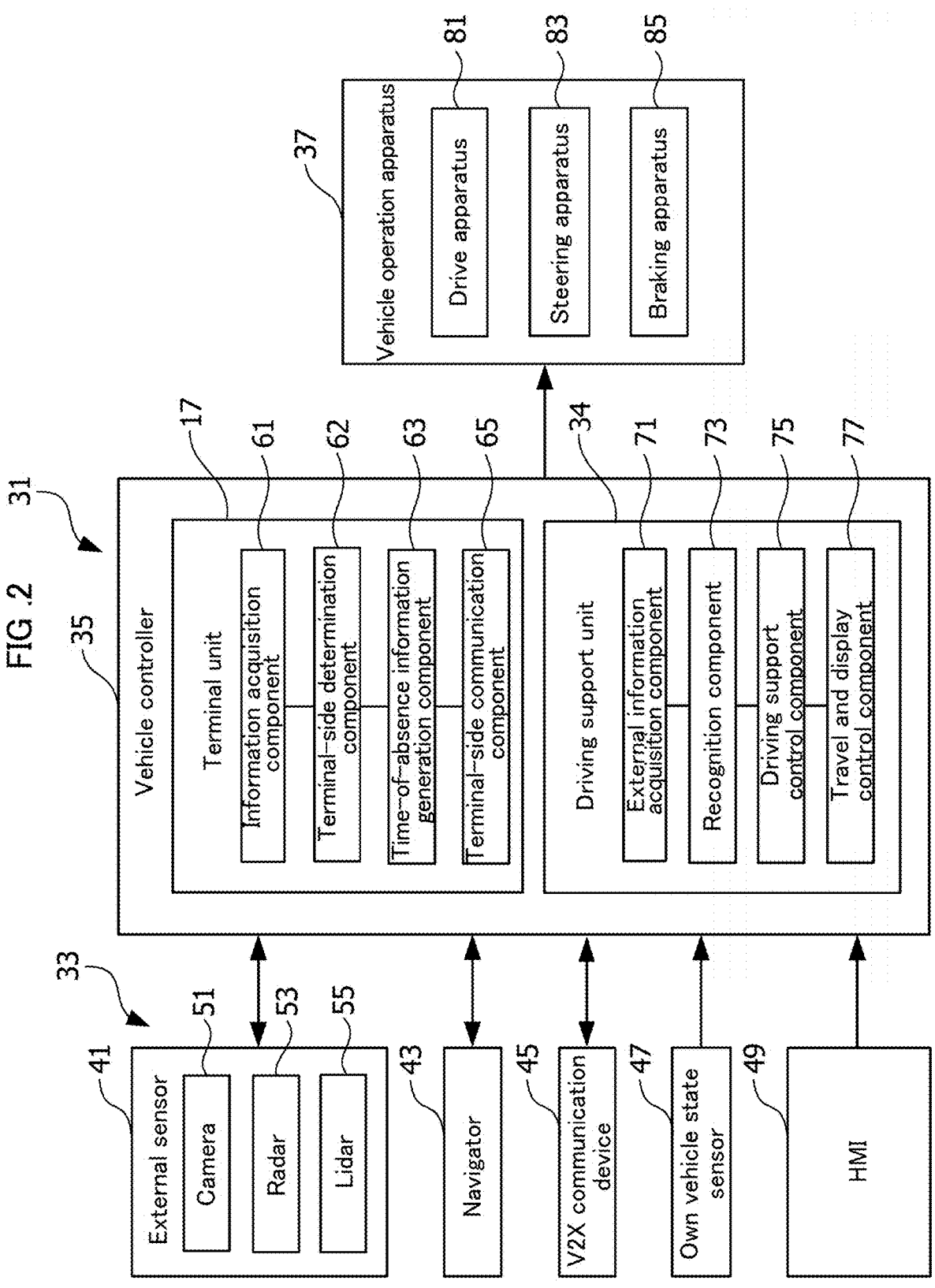
FIG. 2 is a functional block diagram showing a schematic configuration of an on-board device that is equipped with a terminal unit and installed in a vehicle.

FIG. 2 is a functional block diagram showing an overall configuration of an on-board device 31 that is equipped with the terminal unit 17.

As shown in FIG. 2, the on-board device 31 comprises an input-output apparatus 33 and a vehicle controller 35 that includes a terminal unit 17 and a driving support unit 34. The vehicle controller 35 is connected to a vehicle operation apparatus 37.

As shown in FIG. 2, the input-output apparatus 33 comprises an external sensor 41, a navigator 43, a V2X communication device 45, an own vehicle state sensor 47, and an HMI 49 (a human-machine interface 49).

<<External Sensor 41>>

The external sensor 41 includes a function to detect and obtain information on surrounding environment regarding one or more objects including a sign around the vehicle 15 on which the external sensor 41 is installed (an "own vehicle"). The external sensor 41 is configured to include a camera 51, radar 53, and lidar 55.

According to the embodiment, the external sensor 41 includes multiple cameras 51. One of the cameras 51 has an optical axis that is inclined in an obliquely downward direction in the front of the own vehicle 15 and includes a function for capturing an image of an area in the direction of travel of the own vehicle 15. A camera such as a CMOS (complementary metal-oxide semiconductor) camera or CCD (charge-coupled device) camera may be used as the camera 51 as deemed appropriate. The cameras 51 may, for example, be installed in the vicinity of a rearview mirror (not shown) in the own vehicle 15 interior and outside the own vehicle 15 on front portions of the doors on the right and left sides.

The cameras 51 are configured to periodically capture images of the surrounding views to the front in the forward direction of travel, the rear right side, the rear left side, and the rear of the own vehicle 15. The cameras 51 may also capture images of the surrounding views in response to a request from the vehicle controller 35 to acquire mobile object monitoring information.

According to the embodiment, the camera 51 installed in the vicinity of the rearview mirror may, for example, be configured from a pair of monocular cameras arranged next to one another. In some embodiments, the camera 51 may be a stereo camera.

Image information of views to the front in the forward direction of travel, the rear right side, the rear left side, and the rear of the own vehicle 15 that are captured by the cameras 51 are sent to the vehicle controller 35.

The radar 53 includes a function to acquire distribution information of an object, such as another vehicle travelling in front of the own vehicle 15, by irradiating the object with a radar wave and receiving a radar wave reflected from the object. The distribution information of an object includes a distance to the object and a direction thereof. A laser, a microwave, a millimeter-wave, or an ultrasonic wave may for example be used as the radar wave as deemed appropriate.

According to the embodiment, the own vehicle 15 may, for example, be equipped with a total of five radars 53, with three at the front and two at the rear of the own vehicle 15. The distribution information of an object obtained by each radar 53 is sent to the vehicle controller 35.

The lidar (the Light Detection and Ranging) 55 includes a function to detect a presence of an object and a distance thereto by measuring, for example, the time taken to detect scattered light in response to irradiation of light. According to the embodiment, the own vehicle 15 may, for example, be equipped with a total of five lidars 55, with two at the front and three at the rear of the own vehicle 15. The distribution information of an object obtained by each lidar 55 is sent to the vehicle controller 35.

<<The Navigator 43>>

The navigator 43 includes a function to map the current location of a vehicle 15 on which the navigator 43 is installed (an "own vehicle") and to provide route guidance to a destination. The navigator 43 may be configured to include a GNSS (Global Navigation Satellite System) receiver, navigation map information, a display unit with a touch panel that functions as a human-machine interface, a speaker, and a microphone (none are shown in the drawings). The navigator 43 derives the current location of the own vehicle 15 with the GNSS receiver and derives a route from the current location to a destination that is specified by a user.

The current location of the own vehicle 15 and the route to the destination derived by the navigator 43 are provided to the vehicle controller 35.

<<V2X Communication Device 45>>

The V2X communication device 45 that is installed in a vehicle 15 (an "own vehicle") includes a function to perform either a vehicle-to-vehicle communication (a V2V communication) with other vehicles 15 around the own vehicle 15 or a vehicle-to-roadside communication (a V2R communi-
cation) with a roadside unit 21 that is installed by the side of
a main road 7 on which the own vehicle 15 travels. In some
embodiments, TCP/IP may be used as the communication
protocol of the V2X communication device 45.

The V2X communication device 45 broadcasts a time-
of-absence information set (see FIG. 3) generated by the
time-of-absence information generation component 63 (de-
tails will be given later) to vehicles 15 around the own
vehicle 15 and to the roadside unit 21.

<<Own Vehicle State Sensor 47>>

The own vehicle state sensor 47 includes a function to
acquire own vehicle state information concerning the state
of a vehicle 15 in which the own vehicle state sensor 47 is
installed (an "own vehicle"). The own vehicle state infor-
mation acquired by the own vehicle state sensor 47 is sent
to the vehicle controller 35.

The own vehicle state sensor 47 may include a number of
sensors for detecting the behavior of the own vehicle 15 such
as a speed sensor, an acceleration sensor, a steering angle
sensor, a yaw rate sensor, a position sensor, and/or a direc-
tion sensor. The own vehicle state sensor 47 may include a
sensor to detect an action of the driver (an action such as
looking away from the direction of travel) or a sensor to
obtain biological information of the driver (such as a heart
rate or a level of awareness).

<<HMI 49>>

The HMI 49 includes driving operation components and
non-driving operation components. The boundary between
the two sets of components does not have to be clear. In
some embodiments, a driving operation component may
include a function of a non-driving operation (or vice versa).

The driving operation components of the HMI 49 may
include, for example, an accelerator pedal, an accelerator
pedal position sensor, an accelerator pedal reaction force
control device, a brake pedal, a brake pedal position sensor,
a gearshift, a gearshift position sensor, a steering wheel, a
steering angle sensor, and a steering torque sensor.

The non-driving operation components of the HMI 49
may include, for example, a multi-function display arranged
on a console, a speaker, various operation switches, a seat
and seat operation device, a window and window operation
device, and a cabin camera.

<<Configuration of Vehicle Controller 35>>

A description of the inner configuration of the vehicle
controller 35 that is installed on a vehicle 15 (an "own
vehicle") will be given with reference to FIGS. 2 and 3.

FIG. 3 is a schematic diagram showing the configuration
of a data transmission frame 39 that is transmitted from a
terminal unit 17 to a monitoring unit 19 in a mobile object
monitoring system 11 according to an embodiment of the
disclosure.

The vehicle controller 35 may, for example, be realized
with one or more processors or with a piece of hardware that
includes an equivalent function. The vehicle controller 35
may, for example, be configured from one or more MPUs
(micro-processing units) and/or one or more ECUs (an
electronic control unit) that include a processor such as a
CPU (a central processing unit), a memory, and a commu-
nication interface that are inter-connected by a bus.

The vehicle controller 35 includes: (a) a function to
generate a time-of-absence information set regarding an
unknown mobile object 13 around the own vehicle 15 using
the external sensor 41 installed on the own vehicle 15; (b) a
function to broadcast the generated time-of-absence information; and (c) a function to perform driving support of the
own vehicle 15 including acceleration, deceleration, and
steering thereof.

In order to realize the abovementioned functions, the
vehicle controller 35 includes, as shown in FIG. 2, a terminal
unit 17 and a driving support unit 34.

<<Configuration of Terminal Unit 17>>

The terminal unit 17 that is included in the vehicle
controller 35 is described with reference to FIG. 2.

As shown in FIG. 2, the terminal unit 17 of the vehicle
controller 35 is configured to include an information acqui-
sition component 61, a terminal-side determination compo-
nent 62, a time-of-absence information generation compo-
nent 63, and a terminal-side communication component 65.

The information acquisition component 61 includes a
function to acquire unknown mobile object information that
comprises presence or absence information and location
information concerning an unknown mobile object 13
around the own vehicle 15. The location information con-
cerning an unknown mobile object 13 is only acquired when
the unknown mobile object 13 is present.

The presence or absence information concerning an
unknown mobile object 13 is information regarding whether
an unknown mobile object 13 is present or not around the
own vehicle 15. The location information concerning an
unknown mobile object 13 is location information (such as
a three-dimensional coordinate) of an unknown mobile
object 13 at the time of acquisition of information regarding
the unknown mobile object 13 by the external sensor 41.

When multiple unknown mobile objects 13 are present,
the presence or absence information and location informa-
tion concerning an unknown mobile object 13 are acquired
for each of the unknown mobile objects 13 so that the
presence or absence information is associated with the
corresponding location information.

As shown in FIG. 3, the unknown mobile object infor-
mation that includes presence or absence information and
location information concerning an unknown mobile object
13 is used as a part of information included in the data
transmission frame 39.

The terminal-side determination component 62 includes a
function to determine whether an unknown mobile object 13
regarding a predetermined monitored area is present or
absent. According to an embodiment of the disclosure, a
"predetermined monitored area" refers to a blind spot 18
related to a certain point of observation (which may be any
point of observation).

According to an embodiment of the disclosure, a configu-
ration is adopted in which (a) information is sent from the
monitoring unit 19 side to the terminal unit 17 side request-
ing that a blind spot 18 related to a certain point of
observation be set as the predetermined monitored area, and
(b) the terminal unit 17 side sets the blind spot 18 related to
the certain point of observation as the predetermined moni-
tored area. Thus, "to determine whether an unknown mobile
object 13 regarding a predetermined monitored area is
present or absent" means that the presence or absence of an
unknown mobile object 13 in a blind spot 18 related to a
certain point of observation is determined. Detailed descrip-
tion will be given later.

The time-of-absence information generation component
63 includes a function to generate a time-of-absence infor-
mation set concerning an unknown mobile object when the
terminal-side determination component 62 determines that
an unknown mobile object 13 is absent in a monitored area
(a blind spot 18 related to a certain point of observation).
The time-of-absence information set includes (i) absence information on an unknown mobile object 13 regarding the monitored area (a blind spot 18) and (ii) time information on the time when the absence was determined.

The time information on the time when the absence was determined refers to information on the point in time when the terminal-side determination component 62 determined the absence of an unknown mobile object 13 in a monitored area (a blind spot 18). However, this information on the point in time may be allowed a certain margin of time. Therefore, according to an embodiment of the disclosure, the time information is defined as a more generic concept of the information on the point in time.

Thus, the time-of-absence information set concerning an unknown mobile object refers to information indicating the absence of an unknown mobile object 13 in a monitored area (a blind spot 18) in a certain time range.

The information on the point in time is expressed in absolute time. An absolute time refers to a highly accurate and shareable information on time such as time represented as formal elapsed time in seconds (counted as actual elapsed time minus inserted leap seconds plus removed leap seconds) from a given time in UTC (Coordinated Universal Time).

As shown in FIG. 3, the time-of-absence information set concerning an unknown mobile object 13 is used as information of a data transmission frame 39. In addition to the time-of-absence information set, the data transmission frame 39 also includes own vehicle information and destination information (not shown in the drawings). The own vehicle information includes own vehicle identification information, own vehicle location information, and transmission time information.

The own vehicle identification information refers to information that is characteristic of the own vehicle 15 that enables the own vehicle 15 to be uniquely identified. For example, a license plate number of the own vehicle 15 corresponds to the own vehicle identification information.

The own vehicle location information is location information (for example, a three-dimensional coordinate) concerning the own vehicle 15 at the time of acquisition of information regarding an unknown mobile object 13 using the external sensor 41.

The transmission time information is time (a timestamp) when the terminal unit 17 transmits the data transmission frame 39 to the monitoring unit 19.

The destination information is information regarding the destination of the data transmission frame 39. In the embodiment, the destination information of the data transmission frame 39 is set to a broadcast address. The broadcast address is used so that a data communication frame 39 that includes relevant information may be sent out to multiple vehicles 15 at a location such as an intersection where multiple vehicles 15 of unknown addresses may be travelling.

The terminal-side communication component 65 includes a function to transmit a data transmission frame 39, which includes a time-of-absence information set concerning an unknown mobile object 13 generated by the time-of-absence information generation component 63, to a specific destination based on the destination information (a broadcast address).

The functions of the information acquisition component 61, terminal-side determination component 62, time-of-absence information generation component 63, and terminal-side communication component 65 of the terminal unit 17 may be realized through the execution of a program (software) by a processor. In some embodiments, a part or whole of these functions may be realized with hardware such as an LSI (large-scale integration) or ASIC (application specific integrated circuit). In some embodiments, a part or whole of these functions may be realized using a combination of software and hardware.

<<Configuration of Driving Support Unit 34>>

As shown in FIG. 2, the driving support unit 34 included in the vehicle controller 35 is configured to include an external information acquisition component 71, a recognition component 73, a driving support control component 75, and a travel and display control component 77.

The external information acquisition component 71 includes a function to acquire surrounding environment information regarding an object, including a sign, around the own vehicle 15. The surrounding environment information acquired by the external information acquisition component 71 is sent to the recognition component 73.

The recognition component 73 may include functions such as an own vehicle location recognition function, a surrounding environment recognition function, an activity plan generation function, and/or a route generation function.

The own vehicle location recognition function is configured to recognize the driving lane of the own vehicle 15 and the location of the own vehicle 15 relative to the driving lane.

The surrounding environment recognition function is configured to recognize the surroundings of the own vehicle 15 including the location, speed, and acceleration of a surrounding vehicle 15.

The activity plan generation function is configured to set a starting location and destination location of automated vehicle operation.

The route generation function is configured to generate a route along which the own vehicle 15 is to travel, based on an activity plan generated by the activity plan generation function.

Information on the own vehicle location and surrounding environment that is recognized by the recognition component 73 is sent to the driving support control component 75. Information regarding the starting location and/or destination location of automated vehicle operation that is set by the recognition component 73 is sent to the driving support control component 75. Information on the route along which the own vehicle 15 is to travel that is generated by the recognition component 73 is sent to the driving support control component 75.

The driving support control component 75 includes a function to determine a policy on driving support control that includes driving force control, steering control, and braking force control. The determined policy may be based on information such as an operation of the driver, a starting location of automated vehicle operation that is set by the activity plan generation function, a destination location of automated vehicle operation that is set by the activity plan generation function, a route generated by the route generation function along which the own vehicle 15 is to travel, or any combination of the above. The policy on driving support control that is determined by the driving support control component 75 is sent to the travel and display control component 77.

The travel and display control component 77 performs travel control of the own vehicle 15 including driving force control, steering control, and braking force control in accordance with the policy on driving support control that is determined by the driving support control component 75. Furthermore, the travel and display control component 77 performs display control of a display device that the own vehicle 15 is equipped with.

The functions of the external information acquisition component 71, recognition component 73, driving support control component 75, and travel and display control component 77 of the driving support unit 34 may be realized through the execution of a program (software) by a processor. In some embodiments, a part or whole of these functions may be realized with hardware such as an LSI (large-scale integration) or ASIC (application specific integrated circuit). In some embodiments, a part or whole of these functions may be realized using a combination of software and hardware.

<<Configuration of Vehicle Operation Apparatus 37>>

As shown in FIG. 2, the vehicle operation apparatus 37 is configured to include a drive apparatus 81, steering apparatus 83, and braking apparatus 85.

The drive apparatus 81 outputs driving force (torque) to a driving wheel to enable the own vehicle 15 to move in accordance with a control instruction of the driving support unit 34 that the vehicle controller 35 is equipped with.

When the own vehicle 15 is a vehicle whose power source is an internal combustion engine, then the drive apparatus 81 may, for example, include an internal combustion engine, an engine ECU (an engine electronic control unit) for controlling the internal combustion engine, and a transmission (none shown in the drawings).

When the own vehicle 15 is an electric vehicle whose power source is an electric motor, the drive apparatus 81 may, for example, include a traction motor and a motor ECU (a motor electronic control unit) for controlling the traction motor (neither the traction motor nor the motor ECU are shown in the drawings).

When the own vehicle 15 is a hybrid vehicle, the drive apparatus 81 may, for example, include an internal combustion engine, a transmission, an engine ECU, a traction motor, and a motor ECU (none shown in the drawings).

The steering apparatus 83 may include, for example, a steering ECU (a steering electronic control unit) and an electric motor (neither are shown in the drawings). The electric motor, for example, changes the direction of steered wheels by applying force with a rack and pinion mechanism. The steering ECU drives the electric motor to change the direction of the steered wheel in accordance with information on a steering angle and steering torque based on steering operation of a driver or in accordance with a control instruction by the driving support unit 34 of the vehicle controller 35.

The braking apparatus 85 may, for example, be an electric servo brake system that includes a brake caliper, a cylinder for transmitting hydraulic pressure to the brake caliper, an electric motor for generating hydraulic pressure in a cylinder, and a brake control component (none shown in the drawings). The brake control component of the electric servo brake system controls the electric motor according to a control instruction from the driving support unit 34 of the vehicle controller 35 so that brake torque according to a brake operation is applied to individual wheels.

<<Configuration of Monitoring Unit 19>>

Figure 4:
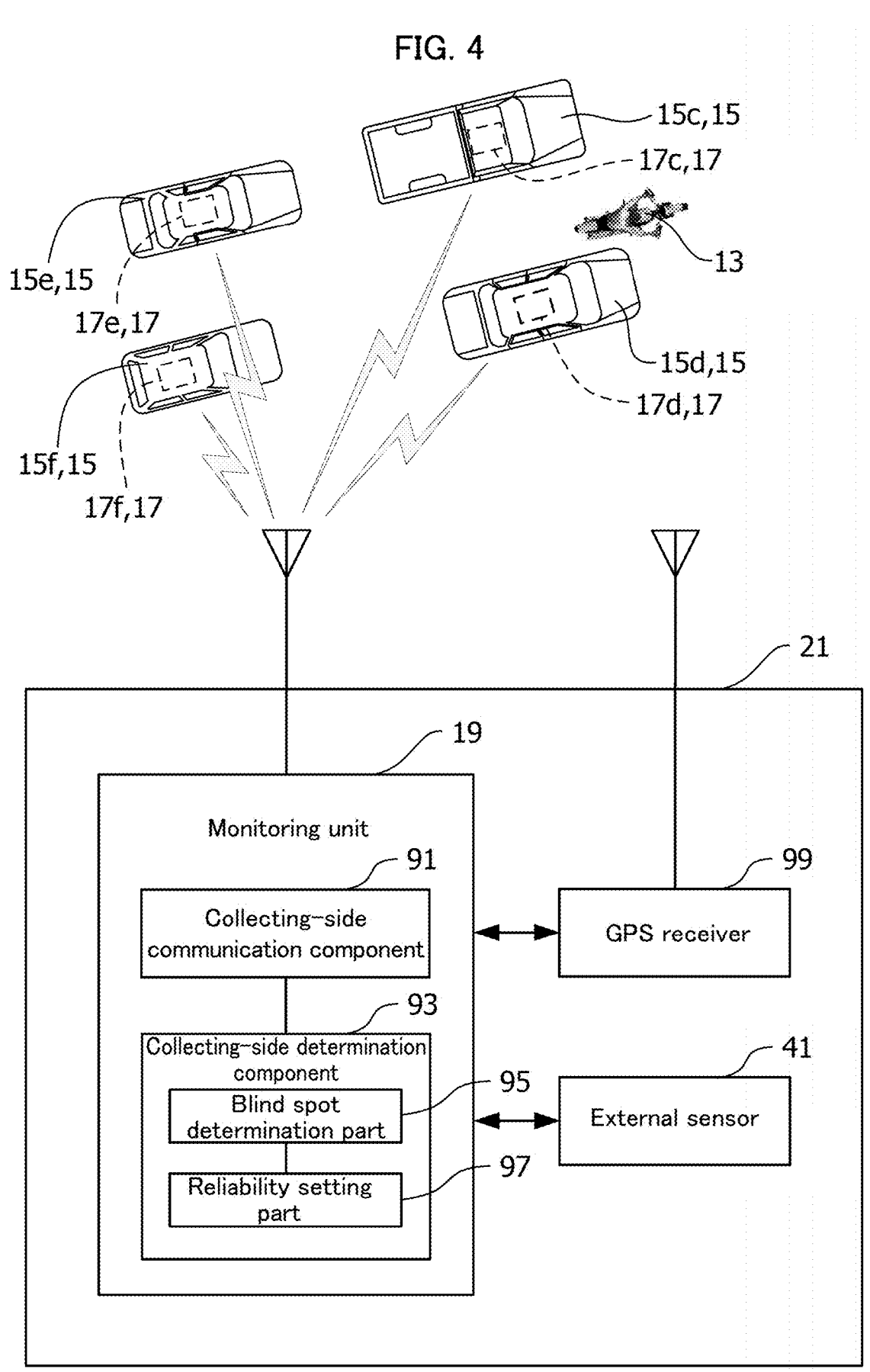
FIG. 4 is a functional block diagram showing a schematic configuration of a monitoring unit.

The monitoring unit 19 that a roadside unit 21 is installed with is described with reference to FIG. 4. FIG. 4 is a functional block diagram showing the configuration of the monitoring unit 19 in schematic form.

The monitoring unit 19 installed in a roadside unit 21 may, for example, be realized with one or more processors or with a piece of hardware that includes an equivalent function. The monitoring unit 19 may, for example, be configured from one or more MPUs (micro-processing units) and/or one or more ECUs (an electronic control unit)

that include a processor such as a CPU (a central processing unit), memory, and communication interface that are interconnected by a bus.

In addition to the monitoring unit 19, the roadside unit 21 is equipped with a GPS receiver 99 and an external sensor 41. Before continuing with the description of the monitoring unit 19 therefore, descriptions of the GPS receiver 99 and external sensor 41 are given below.

The GPS receiver 99 includes a function to receive position signals from multiple GPS satellites and to determine the absolute position (latitude, longitude, and altitude) of the roadside unit 21 based on the position signals.

The external sensor 41 includes a function to detect and acquire information on the surrounding environment of the roadside unit 21 regarding objects including signs that are present around the roadside unit 21.

As shown in FIG. 4, the monitoring unit 19 is configured to include a collecting-side communication component 91 and collecting-side determination component 93.

As shown in FIG. 4, the collecting-side communication component 91 includes a function to receive a time-of-absence information set concerning an unknown mobile object 13 that has been sent from a terminal-side communication component 65 of a terminal unit 17 installed in a vehicle 15. Time-of-absence information sets concerning an unknown mobile object 13 that are each sent from a corresponding one of a plurality of terminal units 17 and received by the collecting-side communication component 91 are sent to the collecting-side determination component 93.

The collecting-side determination component 93 includes a function that, in a basic form, determines whether an unknown mobile object 13 is present of absent based on the plurality of time-of-absence information sets concerning an unknown mobile object 13 that have been received by the collecting-side communication component 91. Described further, based on the plurality of time-of-absence information sets that have been received by the collecting-side communication component 91, the collecting-side determination component 93 determines that an unknown mobile object 13 regarding a monitored area (a blind spot 18) is absent in a time range that is based on time information on the time when absence was determined (time information).

To realize the abovementioned function, the collecting-side determination component 93 is configured to include, as shown in FIG. 4, a blind spot determination part 95 and reliability setting part 97.

The blind spot determination part 95 includes a function to determine the presence or absence of an unknown mobile object 13 in a blind spot 18 related to a point of observation (in the example of FIG. 1, the vehicle 15g).

As described earlier, a blind spot 18 related to a point of observation is an area that cannot be viewed directly from the point of observation and is an area that spreads behind an object (including a sign) that is present around the point of observation.

To determine the presence or absence of an unknown mobile object 13 in a blind spot 18 related to a point of observation, technologies regarding blind spot determination disclosed in Patent Literature 2 of the Applicant (publication number WO 2018/216194, filed May 26, 2017) and Patent Literature 3 of the Applicant (publication number US 2020/0180638, published Jun. 11, 2020) may, for example, be adopted as deemed appropriate. Teachings regarding blind spot determination disclosed in Patent Literature 2 and Patent Literature 3 are incorporated herein by reference (as part of the description regarding determination of the presence or absence of an unknown mobile object 13 in a blind spot 18 related to a point of observation).

The reliability setting part 97 includes a function to establish, regarding a plurality of time-of-absence information sets received by the collecting-side communication component 91, the reliability of the absence information concerning an unknown mobile object 13 based on the number of time-of-absence information sets whose time range based on time information on the point in time when absence was determined (time information) overlap.

The reliability of absence information is an index that measures the reliability of absence information, that is included in the time-of-absence information sets, indicating the absence of an unknown mobile object 13 in a monitored area (a blind spot 18) in a certain time range.

Different algorithms may be used for setting the reliability of absence information, examples of which will be described later.

The functions of the collecting-side communication component 91 and collecting-side determination component 93 of the monitoring unit 19 may be realized through the execution of a program (software) by a processor. In some embodiments, a part or whole of these functions be realized with hardware such as an LSI (large-scale integration) or ASIC (application specific integrated circuit). In some embodiments, a part or whole of these functions may be realized using a combination of software and hardware.

<<Operation of Mobile Object Monitoring System 11>>

The operation of a mobile object monitoring system 11 according to an embodiment of the disclosure is described with reference to FIG. 5.

Figure 5:
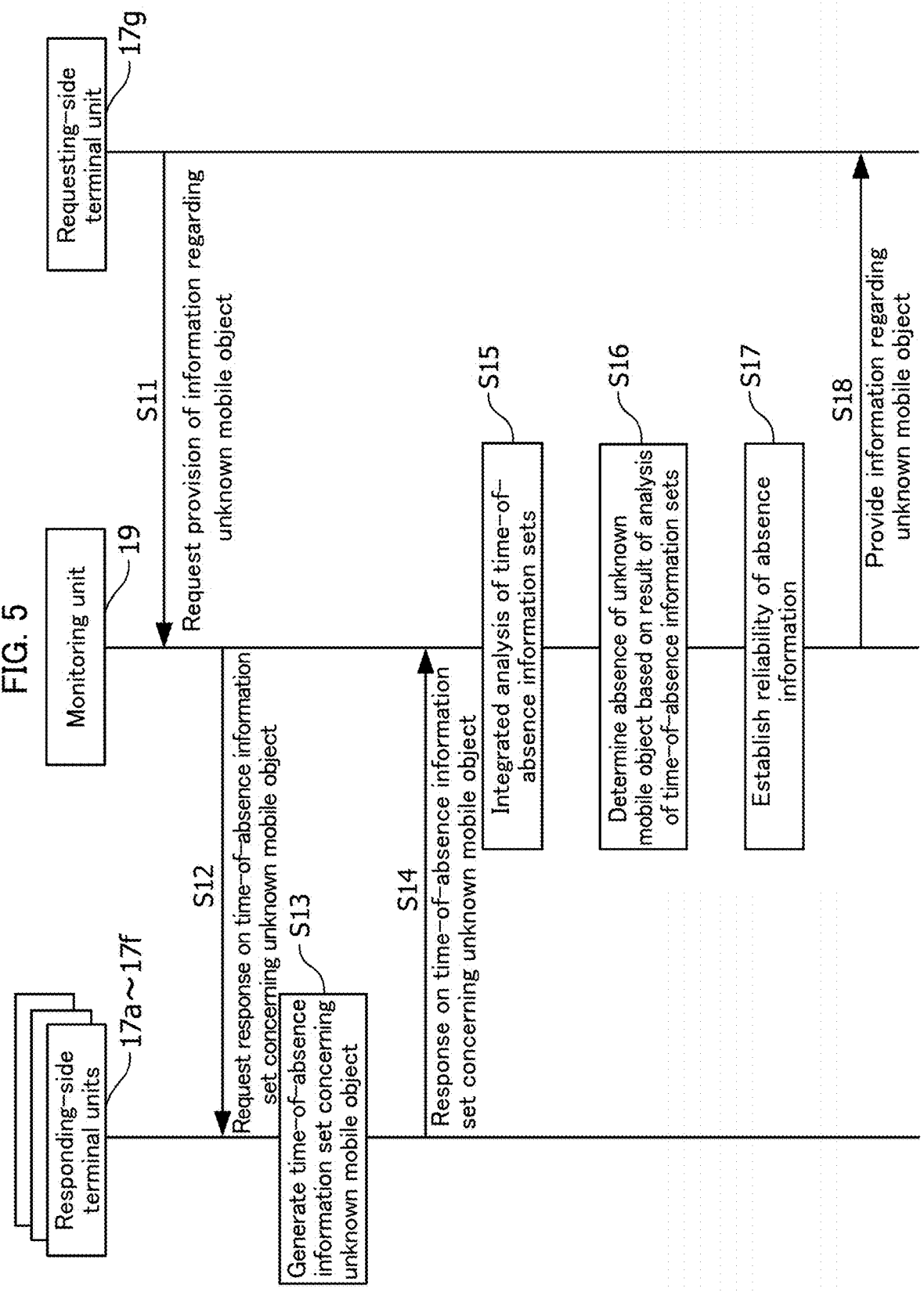
FIG. 5 is a diagram showing a series of steps involving processing of information performed sequentially by a monitoring unit (a requesting side) and terminal units (on a responding side) of a mobile object monitoring system in accordance with at least one embodiment.

FIG. 5 is a diagram showing a series of steps involving the processing of information that are performed sequentially by a monitoring unit 19 (a requesting side) and individual terminal units 17 (on a responding side) of a mobile object monitoring system 11 in accordance with at least one embodiment.

In the mobile object monitoring system 11, the processing of information is performed individually by (a) a requesting-side on-board device that requests a time-of-absence information set regarding an unknown mobile object 13 (in the example of FIG. 1, the terminal unit 17g of the vehicle 15g), (b) a responding-side on-board device that responds by acquiring a time-of-absence information set concerning an unknown mobile object 13 (in the example of FIG. 1, each of the plurality of terminal units 17a-17f that are installed respectively in the plurality of vehicles 15a-15f), and (c) a monitoring unit 19 (installed on the roadside unit 21) that mediates the exchange of information between the on-board devices, under a traffic environment such as the three-way junction 5 shown in FIG. 1.

In step S11 of FIG. 5, the requesting-side terminal unit 17g (that is included in an on-board device 31) of vehicle 15g transmits a request-for-information-provision signal requesting a provision of information regarding an unknown mobile object 13 through broadcasting via a termina-side communication component 65 and V2X communication device 45.

The vehicle 15g installed with the requesting-side terminal unit 17g is waiting (temporarily stationary) at the stop line 10 of the minor road 9. The driver of the vehicle 15g is looking to join the traffic on the main road 7 by using the gap 16 between vehicles 15b and 15d on the right-hand lane 7a.

The transmission of the request-for-information-provision signal by the requesting-side terminal unit 17g of step S11 may be omitted.

In step S12, the monitoring unit 19, upon receiving the request-for-information-provision signal from the requesting-side terminal unit 17g, transmits a request-to-respond-with-information signal requesting a response on a time-of-absence information set concerning an unknown mobile object 13 through broadcasting via the collecting-side communication component 91. In this request-to-respond-with-information signal, information is included on a designated time when unknown mobile object information is to be acquired by the responding-side terminal units 17a-17f.

Consider a case where a single unknown mobile object 13 is present in a blind spot at a designated time for acquiring the unknown mobile object information. When this time for acquiring the unknown mobile object information is not designated, the resulting group of unknown mobile object information acquired at different times will indicate the presence of the unknown mobile object 13 at different locations that correspond to the different times of acquisition. As a consequence, identification of the unknown mobile object 13 by integrating time-of-absence information sets concerning an unknown mobile object 13 that include the concept of the unknown mobile object information becomes more difficult.

Next, consider a case where an unknown mobile object 13 is not present at a designated time for acquiring the unknown mobile object information. When this time for acquiring the unknown mobile object information is not designated, the monitoring unit 19 will receive responses of time-of-absence information sets concerning an unknown mobile object 13 that have been acquired at different times.

Multiple time-of-absence information sets whose time ranges that are based on the time information on the time of determination of absence (time information) will be collected by the monitoring unit 19. In this case, there may be a reduced number of time-of-absence information sets whose time ranges based on the time information on the time of determination of absence (time information) overlap for establishing the reliability of absence information concerning an unknown mobile object 13 based on integrated analysis of time-of-absence information sets concerning an unknown mobile object 13. As a result, making use of the integrated analysis for determining the reliability of absence information concerning an unknown mobile object 13 becomes less effective.

The designated time is set to a time that includes a predetermined delay time with respect to the transmission time of request to respond with information signal. The predetermined delay time allows for a preparation period for the responding-side terminal units 17a-17f to acquire the unknown mobile object information at the designated time with certainty.

Even in cases where the transmission of the request-for-information-provision signal by the requesting-side terminal unit 17g of step S11 is omitted, the request-to-respond-with-information signal requesting a response on a time-of-absence information set concerning an unknown mobile object 13 may still be transmitted by the monitoring unit 19 via the collecting-side communication component 91. For example, the monitoring unit 19 may repeatedly broadcast a request-to-respond-with-information signal at a predetermined interval of time. For example, the monitoring unit 19 may broadcast a request-to-respond-with-information signal based on the state of traffic at the three-way junction 5 as perceived by the external sensor 41 of the roadside unit 21. For example, the monitoring unit 19 may broadcast a request-to-respond-with-information signal based on whether there is a vehicle 15 waiting at the stop line 10 of the minor road 9.

In step S13, each of the responding-side terminal units 17*a*-17*f* acquires unknown mobile object information that includes the presence or absence information and location information concerning an unknown mobile object 13 at the designated time included in the request-to-respond-with-information signal. In this example, the unknown mobile object 13 is absent. The responding-side terminal units 17*a*-17*f* each generates a time-of-absence information set concerning an unknown mobile object 13 that includes the acquired absence information of an unknown mobile object 13 and time information on the time of determination of absence.

In step S14, each of the responding-side terminal units 17*a*-17*f* broadcasts, via a terminal-side communication component 65 and V2X communication device, an information response signal (see the data transmission frame 39 of FIG. 3) that includes a response on a time-of-absence information set concerning an unknown mobile object 13.

In step S15, upon receiving the information response signals from the responding-side terminal units 17*a*-17*f*, the monitoring unit 19 integrates and analyzes the time-of-absence information sets concerning an unknown mobile object 13. In the integrated analysis of the time-of-absence information sets concerning an unknown mobile object 13, of a plurality of returned time-of-absence information sets, the number of returned time-of-absence information sets whose time ranges based on time information on the time of determination of absence (time information) overlap with one another is counted. The number of returned one or more time-of-absence information sets whose time ranges that are based on time information on the time of determination of absence (time information) do not overlap is also counted.

In step S16, the monitoring unit 19 determines whether or not an unknown mobile object 13 is absent based on the result of the integrated analysis of time-of-absence detected information sets carried out in step S15.

In step S17, the monitoring unit 19 establishes the reliability of absence information concerning an unknown mobile object 13 based on the result of the analysis of time-of-absence information sets of step S15 (of a plurality of returned time-of-absence information sets, the number of time-of-absence information sets whose time ranges based on time information on the time of determination of absence [time information] overlap with one another).

In this case, the reliability of absence information concerning an unknown mobile object 13 is increased (the level of certainty of a specific unknown mobile object 13 not being present in a blind spot 18 in a certain time range is increased), for example, the higher the number of time-of-absence information sets with overlapping time ranges that are based on time information on the time of determination of absence.

In some embodiments, the monitoring unit 19 may establish the reliability of absence information concerning an unknown mobile object 13 based on the following results of the integrated analysis of time-of-absence information sets of step S15: of a plurality of returned time-of-absence information sets, (i) the number of time-of-absence information sets whose time ranges based on time information on the time of determination of absence overlap with one another and (ii) the number of time-of-absence information sets whose time ranges based on time information on the time of determination of absence do not overlap with one another.

In this case, the reliability of absence information concerning an unknown mobile object 13 may, for example, be raised (the level of certainty of a specific unknown mobile object 13 not being present in a blind spot 18 in a certain time range is increased) the greater the number of time-of-absence information sets whose time ranges based on time information on the time of determination of absence overlap with one another and the greater the sum of responses, the sum of responses being a sum of (i) the number of time-of-absence information sets whose time ranges based on time information on the time of determination of absence overlap with one another and (ii) the number of time-of-absence information sets whose time ranges do not overlap with one another.

In step S18, the monitoring unit 19 broadcasts, via the collecting-side communication component 91, an information provision signal providing information regarding an unknown mobile object 13 including the reliability of absence information concerning an unknown mobile object 13.

The requesting-side terminal unit 17*g* that receives the information provision signal from the roadside unit 21 performs driving support of the own vehicle 15*g* based on the information regarding an unknown mobile object 13. For example, the information regarding an unknown mobile object 13 may be displayed on a multi-function display.

<<Advantageous Effects of Mobile Object Monitoring System 11 and Mobile Object Monitoring Method According to Embodiments>>

A description of the advantageous effects of the mobile object monitoring system 11 and mobile object monitoring method in accordance with the embodiments of the disclosure follows.

In a first aspect of the disclosure, the mobile object monitoring system 11 includes one or more terminal units 17 and a monitoring unit 19 that is configured to monitor an unknown mobile object 13 through collecting information concerning the unknown mobile object 13 around the one or more terminal units 17.

Each of the one or more terminal units 17 includes an information acquisition component 61, a terminal-side determination component 62, a time-of-absence information generation component 63, and a terminal-side communication component 65. The information acquisition component 61 is configured to acquire unknown mobile object information that includes information on presence or absence of an unknown mobile object 13. The terminal-side determination component 62 is configured to determine presence or absence of an unknown mobile object 13 regarding a predetermined monitored area (a blind spot 18). The time-of-absence information generation component 63 is configured to generate, in response to the terminal-side determination component 62 determining that an unknown mobile object 13 is absent from the monitored area (a blind spot 18), a time-of-absence information set concerning an unknown mobile object 13. The time-of-absence information set includes (i) absence information that indicates the absence of an unknown mobile object 13 regarding the monitored area (a blind spot 18) and (ii) time information on a time of the determination. The terminal-side communication component 65 is configured to transmit the time-of-absence information set that has been generated.

The monitoring unit 19 includes a collecting-side communication component 91 and a collecting-side determination component 93. The collecting-side communication component 91 is configured to receive the time-of-absence information set transmitted from the terminal-side communication component 65 of each of the one or more terminal units 17 to form a collection of one or more time-of-absence information sets. The collecting-side determination component 93 is configured to determine, based on the collection of one or more time-of-absence information sets, whether an unknown mobile object 13 regarding the monitored area (a blind spot 18) is absent in a time range that is based on the time information (on the time of determination of absence). The collecting-side determination component 93 is configured to establish reliability of the absence information for the collection of one or more time-of-absence information sets based on the number of time-of-absence information sets with overlapping time ranges that are each related to the corresponding time information.

In the mobile object monitoring system 11 according to the first aspect, the terminal unit 17 performs the following process. The information acquisition component 61 acquires unknown mobile object information that includes information on presence or absence of an unknown mobile object 13. The terminal-side determination component 62 determines presence or absence of an unknown mobile object 13 regarding a predetermined monitored area (a blind spot 18). The time-of-absence information generation component 63 generates, in response to the terminal-side determination component 62 determining that an unknown mobile object 13 is absent from the monitored area (a blind spot 18), a time-of-absence information set concerning an unknown mobile object 13. The time-of-absence information set includes (i) absence information that indicates the absence of an unknown mobile object 13 regarding the monitored area (a blind spot 18) and (ii) time information on the time of the determination. The terminal-side communication component 65 transmits the time-of-absence information set that has been generated.

On the monitoring unit 19 side, the collecting-side communication component 91 receives the time-of-absence information set transmitted from the terminal-side communication component 65 of each of the one or more terminal units 17 to form a collection of one or more time-of-absence information sets. The collecting-side determination component 93 determines, based on the collection of one or more time-of-absence information sets, whether an unknown mobile object 13 regarding the monitored area (a blind spot 18) is absent in a time range that is based on the time information (on the time of determination of absence).

The collecting-side determination component 93 establishes reliability of the absence information for the collection of one or more time-of-absence information sets based on the number of time-of-absence information sets with overlapping time ranges that are each related to the corresponding time information.

The monitoring unit 19 has been described as "a monitoring unit 19 that is configured to monitor an unknown mobile object 13 through collecting information concerning the unknown mobile object 13" to make clear that the direct monitoring of an unknown mobile object 13 is not a requisite function of the monitoring unit 19. In some embodiments, however, the monitoring unit 19 may include a function to monitor an unknown mobile object 13 directly.

The description that the monitoring unit 19 "establishes reliability of the absence information" indicates that the measure of reliability of the absence information is established. According to the first aspect, the reliability of the absence information is set to a value based on the number of time-of-absence information sets whose time information-related time ranges overlap.

In some embodiments, the terminal unit 17 may be installed in a mobile object that includes a communication function (such as a vehicle 15). In some embodiments, the terminal unit 17 may be installed in a roadside unit 21 that includes a communication function.

In some embodiments, the monitoring unit 19 may, similar to the terminal unit 17, be installed in a mobile object that includes a communication function (such as a vehicle 15). In some embodiments, the monitoring unit 19 may be installed in a roadside unit 21 that includes a communication function.

The mobile object monitoring system 11 according to the first aspect is configured to monitor an unknown mobile object 13 by collecting, via communication, absence information regarding an unknown mobile object 13 that is obtained at each detection site and integrating the collection of absence information to significantly increase the reliability of absence information regarding an unknown mobile object 13 in a blind spot 18 related to a point of observation.

In a second aspect of the disclosure, the mobile object monitoring system 11 includes (i) multiple terminal units 17 that are each installed in a corresponding one of multiple mobile objects (vehicles 15) and (ii) one monitoring unit 19 that is configured to monitor an unknown mobile object 13 through collecting information concerning an unknown mobile object 13 around each of the mobile objects (vehicles 15).

Each of the terminal units 17 includes an information acquisition component 61, a terminal-side determination component 62, a time-of-absence information generation component 63, and a terminal-side communication component 65. The information acquisition component 61 is configured to acquire unknown mobile object information that includes information on presence or absence of an unknown mobile object 13. The terminal-side determination component 62 is configured to determine presence or absence of an unknown mobile object 13 regarding a predetermined monitored area (a blind spot 18). The time-of-absence information generation component 63 is configured to generate, in response to the terminal-side determination component 62 determining that an unknown mobile object 13 is absent from the monitored area (a blind spot 18), a time-of-absence information set concerning an unknown mobile object 13. The time-of-absence information set includes (i) absence information that indicates the absence of an unknown mobile object 13 regarding the monitored area (a blind spot 18) and (ii) time information on a time of the determination. The terminal-side communication component 65 is configured to transmit the time-of-absence information set that has been generated.

The monitoring unit 19 includes a collecting-side communication component 91 and a collecting-side determination component 93. The collecting-side communication component 91 is configured to receive the time-of-absence information set transmitted from the terminal-side communication component 65 of each of the terminal units 17 to form a collection of time-of-absence information sets. The collecting-side determination component 93 is configured to determine, based on the collection of time-of-absence information sets, whether an unknown mobile object 13 regarding the monitored area (a blind spot 18) is absent in a time range that is based on the time information (on the time of determination of absence).

The collecting-side determination component 93 is configured to establish reliability of the absence information for the collection of one or more time-of-absence information sets based on the number of time-of-absence information sets with overlapping time ranges that are each related to the corresponding time information.

The mobile object monitoring system 11 according to the second aspect differs from the mobile object monitoring system 11 according to the first aspect in that multiple terminal units 17, which are each installed in a corresponding one of multiple mobiles objects (vehicles 15), are associated with a single monitoring unit 19 in the former (the second aspect).

In the mobile object monitoring system 11 according to the second aspect, the terminal units 17 that are installed in corresponding mobile objects (vehicle 15) each performs the following process. The information acquisition component 61 acquires unknown mobile object information that includes information on presence or absence of an unknown mobile object 13. The terminal-side determination component 62 determines presence or absence of an unknown mobile object 13 regarding a predetermined monitored area (a blind spot 18). The time-of-absence information generation component 63 generates, in response to the terminal-side determination component 62 determining that an unknown mobile object 13 is absent from the monitored area (a blind spot 18), a time-of-absence information set concerning an unknown mobile object 13. The time-of-absence information set includes (i) absence information that indicates the absence of an unknown mobile object 13 regarding the monitored area (a blind spot 18) and (ii) time information on the time of the determination. The terminal-side communication component 65 transmits the time-of-absence information set that has been generated.

On the monitoring unit 19 side, the collecting-side communication component 91 receives the time-of-absence information set transmitted from the terminal-side communication component 65 of each of the terminal units 17 to form a collection of time-of-absence information sets. The collecting-side determination component 93 determines, based on the collection of time-of-absence information sets, whether an unknown mobile object 13 regarding the monitored area (a blind spot 18) is absent in a time range that is based on the time information (on the time of determination of absence).

The collecting-side determination component 93 establishes reliability of the absence information for the collection of time-of-absence information sets based on the number of time-of-absence information sets with overlapping time ranges that are each related to the corresponding time information (on the time of determination of absence).

In some embodiments, the terminal unit 17 may be installed in a mobile object (a vehicle 15) that includes a communication function. In some embodiments, the terminal unit 17 may be installed in a roadside unit 21 that includes a communication function. Note that these are similar to the examples of the mobile object monitoring system 11 according to the first aspect.

In some embodiments, the monitoring unit 19 may be installed in a mobile object (a vehicle 15) that includes a communication function. In some embodiments, the monitoring unit 19 may be installed in a roadside unit 21 that includes a communication function. Note that these are similar to the examples of the mobile object monitoring system 11 according to the first aspect.

The mobile object monitoring system 11 according to the second aspect is configured to monitor an unknown mobile object 13 by collecting, via communication, absence information regarding an unknown mobile object 13 that is obtained at each detection site and integrating the collection of absence information to significantly increase the reliability of absence information regarding an unknown mobile object 13 in a blind spot 18 related to a point of observation.

The mobile object monitoring system 11 according to the second aspect adopts a configuration of a more generic concept in which the monitoring unit 19 may be installed in a vehicle 15 that includes a communication function or in a roadside unit 21 that includes a communication function.

Figure 6:
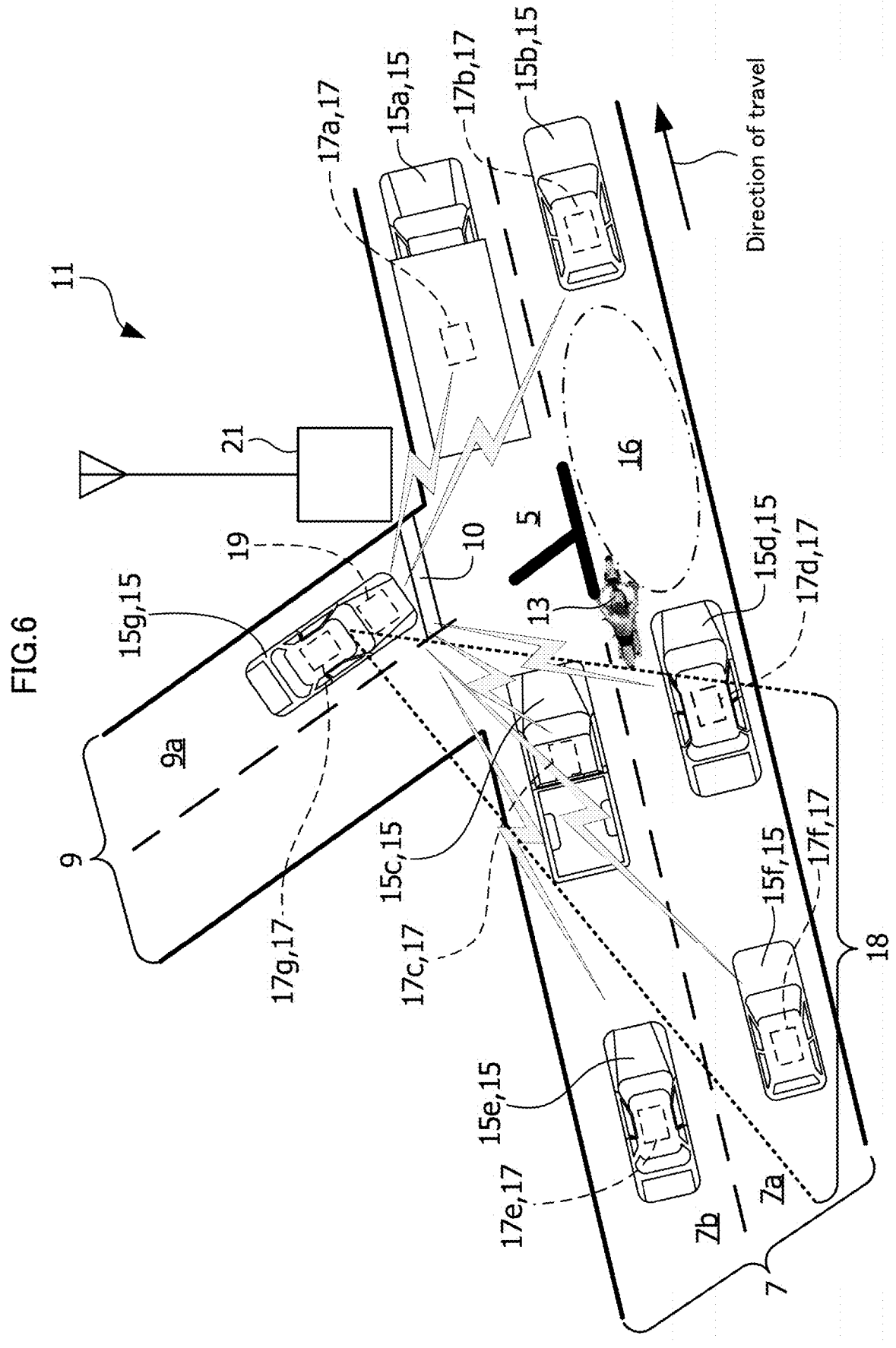
FIG. 6 is a schematic diagram showing an overview of a mobile object monitoring system in accordance with a variation of an embodiment.

In a third aspect of the disclosure, the mobile object monitoring system 11 is in accordance with the second aspect, and, as shown in FIG. 6, is further configured so that (i) the multiple terminal units 17 are each installed in a corresponding one of multiple mobile objects such as vehicles 15, (ii) the mobile unit 19 is installed in a mobile object such as a vehicle 15, and (iii) the collecting-side communication component 91 of the monitoring unit 19 installed in a mobile object receives the time-of-absence information set transmitted from the terminal-side communication component 65 of each of the terminal units 17 to form a collection of time-of-absence information sets by communicating with the multiple terminal units 17 that are each installed in a corresponding one of the multiple mobile objects.

The configuration of a monitoring unit 19 shown in FIG. 4 may be used for the monitoring unit 19 installed in a mobile object (a vehicle 15). In cases where the configuration of the monitoring unit 19 shown in FIG. 4 is adopted, for the external sensor 41, the one installed in the mobile object (a vehicle 15) may be used, and for the GPS receiver 99, the one included in the navigator 43 of the mobile object (a vehicle 15) may be used.

The mobile object monitoring system 11 according to the third aspect differs from the mobile object monitoring system 11 according to the second aspect in that the monitoring unit 19 is installed in a mobile object (a vehicle 15) in the former (the third aspect).

Therefore, in the mobile object monitoring system 11 according to the third aspect, the collecting-side communication component 91 of the monitoring unit 19 that is installed in a mobile object (vehicle 15) receives the time-of-absence information set transmitted from the terminal-side communication component 65 of each of the multiple terminal units 17 to form a collection of time-of-absence information sets by communicating with the multiple terminal units 17 that are each installed in a corresponding one of the multiple mobile objects.

The mobile object monitoring system 11 according to the third aspect is configured to monitor an unknown mobile object 13 by collecting, via communication with multiple mobiles objects (vehicle 15), absence information regarding an unknown mobile object 13 that is obtained at each detection site and integrating the collection of absence information to significantly increase the reliability of absence information regarding an unknown mobile object 13 in a blind spot 18 related to a point of observation.

In a fourth aspect of the disclosure, the mobile object monitoring system 11 is in accordance with the third aspect, and is further configured so that (i) the collecting-side communication component 91 of the monitoring unit 19 transmits information on a blind spot 18 of a monitoring mobile object (a vehicle 15) that is installed with the monitoring unit 19, and (ii) the terminal-side communication component 65 of each of the terminal units 17 receives the information on the blind spot 18 of the monitoring mobile object (a vehicle 15).

Furthermore, the terminal-side determination component 62 of each of the terminal units 17 is configured to (i) set the blind spot 18 of the monitoring mobile object (a vehicle 15)

as the predetermined monitored area, and (ii) determine the presence or absence of an unknown mobile object 13 regarding the predetermined monitored area that has been set to the blind spot 18 of the monitoring mobile object.

In the mobile object monitoring system 11 according to the fourth aspect, the collecting-side communication component 91 of the monitoring unit 19 transmits information on a blind spot 18 of a monitoring mobile object (a vehicle 15) that is installed with the monitoring unit 19, and the terminal-side communication component 65 of each of the terminal units 17 receives the information on the blind spot 18 of the monitoring mobile object (a vehicle 15).

Furthermore, the terminal-side determination component 62 of each of the terminal units 17 sets the received blind spot 18 of the monitoring mobile object (a vehicle 15) as the predetermined monitored area, and determines the presence or absence of an unknown mobile object 13 regarding the predetermined monitored area that has been set to the blind spot 18 of the monitoring mobile object.

According to the fourth aspect, the mobile object monitoring system 11 is configured so that the collecting-side communication component 91 of the monitoring unit 19 transmits information on a blind spot 18 of a monitoring mobile object (a vehicle 15). Furthermore, the mobile object monitoring system 11 is configured so that the terminal-side determination component 62 of each of the terminal units 17 sets the blind spot 18 of the monitoring mobile object (a vehicle 15), which has been sent from the collecting-side communication component 91 of the monitoring unit 19, as the predetermined monitored area, and determines the presence or absence of an unknown mobile object 13 regarding the predetermined monitored area (the blind spot 18) that has been set. Compared to the mobile object monitoring system 11 according to the third aspect (the monitoring unit 19 is installed in a mobile object [a vehicle 15]), even in cases where the size of the blind spot 18 changes with time as the monitoring mobile object (a vehicle 15) travels, the presence or absence of an unknown mobile object 13 may be determined in accordance with the change in size of the blind spot 18.

As a consequence, even in cases where the size of the blind spot 18 changes with time, the absence information of an unknown mobile object 13 for a blind spot 18 may be acquired in a timely and suitable manner.

In a fifth aspect of the disclosure, the mobile object monitoring system 11 is in accordance with the first, second, third, or fourth aspect. Furthermore, the collecting-side communication component 91 of the monitoring unit 19 is configured to transmit a request to acquire the unknown mobile object information at a specified time, and the information acquisition component 61 of each of a plurality of terminal units 17 is configured to acquire the unknown mobile object information at the specified time.

In the mobile object monitoring system 11 according to the fifth aspect, the collecting-side communication component 91 of the monitoring unit 19 transmits a request to acquire the unknown mobile object information at a specified time, and the information acquisition component 61 of each of the plurality of terminal units 17 acquires the unknown mobile object information at the specified time.

According to the fifth aspect, the mobile object monitoring system 11 is configured so that the collecting-side communication component 91 of the monitoring unit 19 transmits a request to acquire the unknown mobile object information at a specified time, and the information acquisition component 61 of each of the plurality of terminal units 17 acquires the unknown mobile object information at the specified time. Compared to a mobile object monitoring system 11 according to the first, second, third, or fourth aspect, the process of acquiring and generating a time-of-absence information set concerning an unknown mobile object 13, which is a more specific concept of the unknown mobile object information, may be simplified and carried out with greater accuracy.

In a sixth aspect of the disclosure, the mobile object monitoring system 11 is in accordance with the fourth aspect, and is further configured so that the collecting-side determination component 93 of the monitoring unit 19 establishes the reliability of the absence information for the collection of time-of-absence information sets based further on a sum of a first number and second number. The first number is the number of time-of-absence information sets in a first group of time-of-absence information sets with overlapping time ranges that are each related to the corresponding time information (on the time of determination of absence). The first group of time-of-absence information sets forms a part or whole of the collection of time-of-absence information sets. The second number is the number of one or more time-of-absence information sets in a second group of one or more time-of-absence information sets that each has a non-overlapping time range related to the corresponding time information. The second group of one or more time-of-absence information sets forms a part or whole of the collection of time-of-absence information sets.

In the mobile object monitoring system 11 according to the sixth aspect, the collecting-side determination component 93 of the monitoring unit 19 establishes the reliability of the absence information for the collection of time-of-absence information sets based further on a sum of a first number and second number, the first number being the number of time-of-absence information sets whose time information-based time ranges overlap, and the second number being the number of one or more time-of-absence information sets that are each without an overlapping time information-based time range.

Note that in the case where all the time-of-absence information sets in the collection of time-of-absence information sets have overlapping time information-based time ranges, the second number will be zero.

Note that the sum of the first number and the second number is information (a parameter) on the number of mobile objects (vehicles 15) installed with a terminal unit 17 that is capable of providing absence information regarding an unknown mobile object 13 to the monitoring unit 19.

The reliability of absence information is a subject matter that may be processed statistically. Thus, in the mobile object monitoring system 11 according to the sixth aspect, information (a parameter) on the number of mobile objects (vehicles 15) installed with a terminal unit 17 that is capable of providing information regarding an unknown mobile object 13 to the monitoring unit 19 may be taken into account when establishing the reliability of absence information.

Because information (a parameter) on the number of mobile objects (vehicles 15) installed with a terminal unit 17 that is capable of providing information regarding an unknown mobile object 13 to the monitoring unit 19 may be taken into account when establishing the reliability of absence information, an advantageous effect can be expected in the mobile object monitoring system 11 according to the sixth aspect. Compared to the mobile object monitoring system 11 according to the fourth aspect, it can be expected that the reliability of absence information to be established with greater accuracy.

The mobile object monitoring method according to a seventh aspect of the disclosure is intended to be used in a mobile object monitoring system 11 that includes (a) multiple terminal units 17 that are each installed in a corresponding one of a plurality of mobile objects (vehicles 15) and (b) a single monitoring unit 19 configured to collect information concerning an unknown mobile object 13 around each of the plurality of mobile objects (vehicles 15) and to monitor the unknown mobile object 13.

The mobile object monitoring method includes: acquiring, by each of the terminal units 17, unknown mobile object information, the unknown mobile object information including information on presence or absence of an unknown mobile object 13; determining, by each of the terminal units 17, presence or absence of an unknown mobile object 13 regarding a predetermined monitored area (a blind spot 18); generating, by each of the terminal units 17, a time-of-absence information set concerning an unknown mobile object 13 in response to determining that an unknown mobile object 13 is absent from the monitored area (a blind spot 18), the time-of-absence information set including absence information indicating the absence of an unknown mobile object 13 regarding the monitored area (a blind spot 18) and time information on a time of the determination; and transmitting, by each of the terminal units 17, the time-of-absence information set that is generated.

The mobile object monitoring method further includes: receiving, by the monitoring unit 19, the time-of-absence information set transmitted from each of the terminal-side communication components 65 to form a collection of time-of-absence information sets; and, based on the collection of time-of-absence information sets, determining, by the monitoring unit 19, whether an unknown mobile object 13 regarding the monitored area (a blind spot 18) is absent in a certain time range that is based on the time information (on the time of determination of absence).

In determining whether an unknown mobile object 13 regarding the monitored area (a blind spot 18) is absent in the certain time range, reliability of the absence information is established for the collection of time-of-absence information sets based on the number of time-of-absence information sets in a first group of time-of-absence information sets, the time-of-absence information sets in the first group having overlapping time ranges that are based on the time information (on the time of determination of absence).

The mobile object monitoring method according to the seventh aspect is a method claim that corresponds to the configuration of the mobile object monitoring system 11 according to the second aspect.

Similar to the mobile object monitoring system 11 according to the second aspect, the mobile object monitoring method according to the seventh aspect monitors an unknown mobile object 13 by collecting, via communication, absence information regarding an unknown mobile object 13 that have been acquired at each detection site and integrating the collection of absence information, thereby improving the reliability of absence information regarding an unknown mobile object 13 in a blind spot 18 related to a point of observation.

OTHER EMBODIMENTS

The embodiments described above are examples for realizing the disclosure. Thus, these embodiments should not be used for limiting the technical scope of the disclosure. The disclosure can be implemented in various forms within a scope not departing from the gist or the major features of the disclosure.

For example, in the description of a mobile object monitoring system 11 according to an embodiment of the disclosure, the reliability setting part 97 establishes the reliability of absence information regarding a plurality of time-of-absence information sets that have been received with the collecting-side communication component 91 based on the number of time-of-absence information sets with overlapping time ranges that are based on the time information (on the time of determination of absence). However, the algorithm for establishing the reliability of absence information is not limited to this example. In one or more embodiments, a different algorithm for setting the reliability of absence information may be used.

An embodiment of the disclosure may be realized by supplying a program (a collection of computer executable instructions) that realizes one or more functions of the embodiment to a system or apparatus via a network or a non-transitory storage medium and by having one or more processors of a computer of the system or apparatus read out and execute the computer executable instructions of the program. An embodiment of the disclosure may include a circuit (for example, application specific integrated circuit [ASIC]) that realizes one or more functions of the embodiment. Information including a program that realizes one or more functions of an embodiment may be stored in a non-transitory storage medium such as a memory, a hard disk, a memory card, or an optical disc.

Although left-hand traffic has been used in the example used in the description, the disclosure is also applicable to right-hand traffic.

What is claimed is:

1. A mobile object monitoring method used in a mobile object monitoring system including: two or more first terminal units that are each installed in a corresponding first mobile object of a plurality of first mobile objects; and a single monitoring unit that is configured to collect information concerning an unknown mobile object around each of the plurality of first mobile objects and to monitor the unknown mobile object; and a second terminal unit that is installed in a second mobile object, the mobile object monitoring method comprising:

transmitting, by the monitoring unit, information on a blind spot of the second mobile object;

receiving, by each of the first terminal units, the information on the blind spot of the second mobile object;

setting, by each of the first terminal units, the received blind spot of the second mobile object as a predetermined monitored area;

acquiring, by each of the first terminal units using a sensor that is installed on a corresponding first mobile object and configured to detect information on surrounding environment around the corresponding first mobile object, unknown mobile object information, the unknown mobile object information including information on presence or absence of the unknown mobile object;

based on the acquired unknown mobile object information, determining, by each of the first terminal units, presence or absence of the unknown mobile object in the predetermined monitored area;

generating, by each of the first terminal units, a time-of-absence information set concerning the unknown mobile object in response to determining that the unknown mobile object is absent in the predetermined monitored area, the time-of-absence information set including absence information indicating the absence of the unknown mobile object in the predetermined monitored area and time information on a time of the determination;

transmitting, by each of the first terminal units, the time-of-absence information set that is generated;

receiving, by the monitoring unit, the time-of-absence information set transmitted from each of the first terminal units to form a collection of time-of-absence information sets;

based on the collection of time-of-absence information sets, determining, by the monitoring unit, whether the unknown mobile object regarding the predetermined monitored area is absent in a time range that is based on the time information, wherein in determining whether the unknown mobile object regarding the predetermined monitored area is absent in a time range that is based on the time information, reliability of the absence information is established for the collection of time-of-absence information sets based on the number of time-of-absence information sets in a first group of time-of-absence information sets, the time-of-absence information sets in the first group having overlapping time ranges that are based on the time information.

2. The mobile object monitoring method according to claim 1, further comprising:

transmitting, by the monitoring unit, information regarding the unknown mobile object including the reliability of the absence information;

receiving, by the second terminal unit, the information regarding the unknown mobile object transmitted by the monitoring unit; and performing, by the second terminal unit, driving support of the second mobile object based on the received information regarding the unknown mobile object.

* * * * *